INVENTOR.
PAUL R. STAPLES

Aug. 23, 1960 P. R. STAPLES 2,949,876
APPARATUS FOR EXPANDING PRESSURE WELDED
PASSAGEWAY PANELS ON ONE SIDE
Filed Jan. 20, 1958 3 Sheets-Sheet 2

INVENTOR.
PAUL R. STAPLES

BY Arthur H Robert

ATTORNEY

Aug. 23, 1960 P. R. STAPLES 2,949,876
APPARATUS FOR EXPANDING PRESSURE WELDED
PASSAGEWAY PANELS ON ONE SIDE
Filed Jan. 20, 1958 3 Sheets-Sheet 3

INVENTOR.
PAUL R. STAPLES
BY
*Arthur H. Robert*
ATTORNEY

2,949,876

APPARATUS FOR EXPANDING PRESSURE WELDED PASSAGEWAY PANELS ON ONE SIDE

Paul R. Staples, Louisville, Ky., assignor to Reynolds Metals Company, Richmond, Va., a corporation of Delaware Filed Jan. 20, 1958, Ser. No. 710,003

13 Claims. (Cl. 113—44)

This invention relates to an apparatus for expanding pressure welded passageway panels on one side.

A conventional method for expanding such panels on one side comprises: confining the unexpanded panel between an upper "flat" platen and a lower "cavitied" platen having a "pan-like" flat-bottomed cavity, with the upper face of the panel in flush engagement with the upper platen and its lower face closing the top of said cavity and having sealed engagement with the lower platen along the margin of said cavity; introducing a holding fluid pressure into the cavity to press the panel upwardly against the upper flat platen; and introducing a higher expansion fluid pressure into the panel to expand the passageway walls on the lower face of the panel downwardly into flat-faced contact with the bottom of the cavity while continuing to hold the upper face of the panel in firm flush engagement with the upper flat platen. To provide sealed engagement between the lower face of the panel and the lower platen, a flat gasket-like sealing ring is usually positioned on the lower platen to extend within said cavity along its periphery.

The conventional apparatus is objectionable because: the cavitied platen is relatively expensive to make, both in material cost and labor for making it; it must be replaced each time the passageway pattern is changed to one of substantially different size; it is heavy and hard to handle; and the sealing ring in the cavity tends to become displaced each time an expanded panel is removed.

The principal object of this invention is to provide a one-side panel expansion apparatus which substantially minimizes or eliminates the foregoing objections.

Other objects of this invention reside in the provision of a one-side panel expansion apparatus having one or more of the following advantages viz: it can be inexpensively manufactured; it can be easily and quickly installed and operated; it can be easily and quickly replaced with a like apparatus which accommodates a different range of panel sizes; it holds the sealing ring against displacement during the removal of one expanded panel or the insertion of an unexpanded panel; it automatically positions the upper and lower platen surfaces in parallel; it accurately controls the height of the expanded passageway walls; and it permits each unexpanded panel to be placed easily and quickly in a predetermined position which can be selected so as to minimize any off-center loading of the press used to hold the platens together during the expansion of the panel.

Still another object of this invention is to provide a one-side panel expansion apparatus which can simultaneously expand one portion of the panel passageways on one panel face and another portion on the opposite panel face.

These objects are achieved in my apparatus as follows: (1) by mounting a gasket-like sealing ring removably upon one platen, say the lower platen, so that it cooperates therewith to form the cavity for the holding pressure fluid; (2) by dimensioning the ring so that each panel placed over it will completely cover the cavity and overlap the adjacent inner portion of the margin of the ring, leaving the outer portion thereof uncovered; (3) by surrounding that sealing ring with an endless close-fitting gasket-like metal shim which not only centers the sealing ring accurately but also supports it against horizontally outward displacement; and (4) by using another gasket-like shim to cover the outer portion of the margin of the sealing ring and thereby hold it against vertical displacement, this other shim being mounted to extend widthwise over the face of the endless shim and the adjacent outer portion of the width of the sealing ring and lengthwise continuously around the panel and along the outer periphery of the sealing ring except in the area where an expansion fluid supply system is to be connected to an inlet in the margin of the panel.

The one side expansion apparatus for the other face of the panel includes an additional cavity forming sealing ring and surrounding metal shim mounted against the upper platen to provide an additional cavity which is offset transversely from the cavity on the lower platen.

The invention is illustrated in the accompanying drawing wherein.

Figure 1:
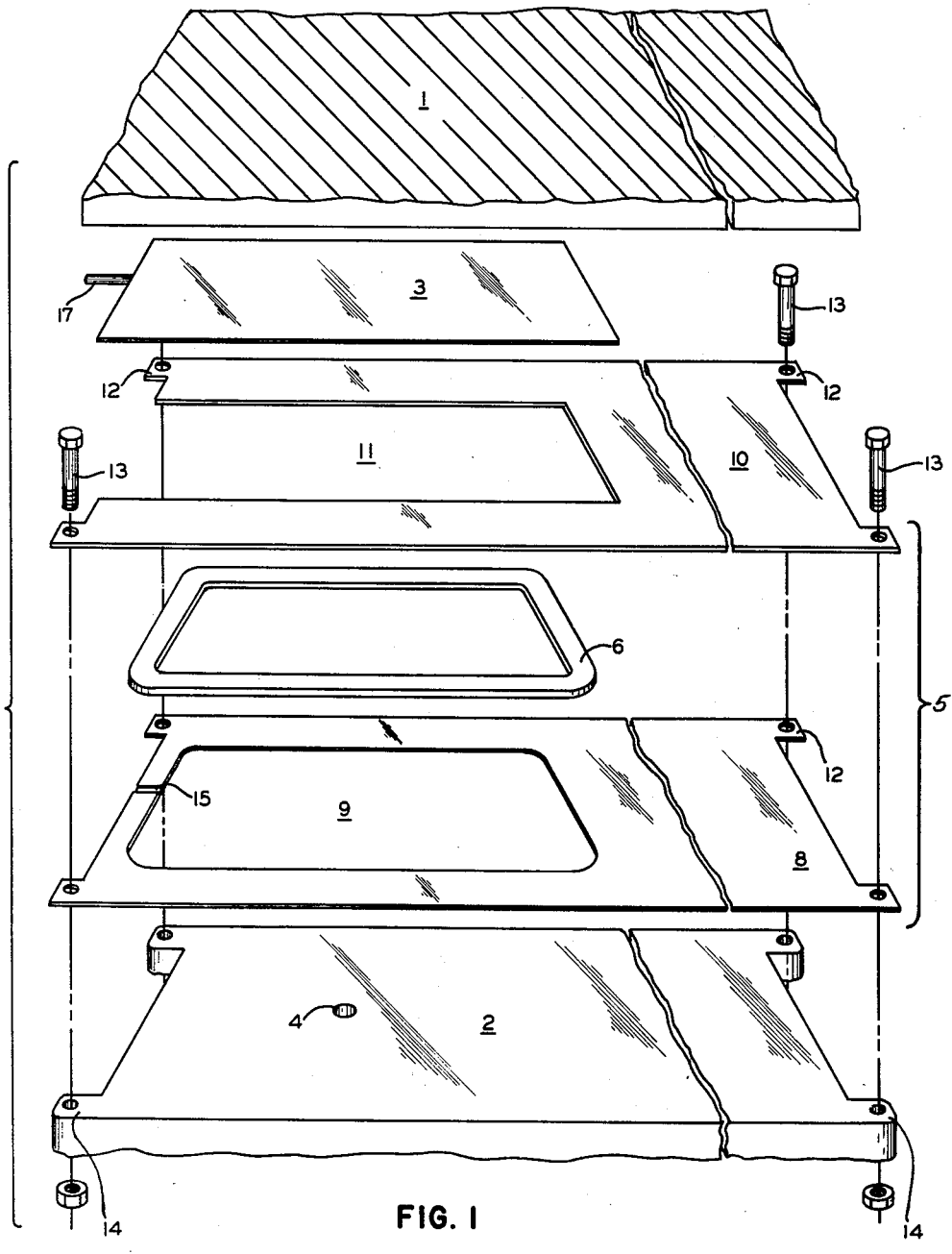
Fig. 1 is an exploded perspective view of the novel panel expansion apparatus and a panel prior to being expanded.

The panel expansion apparatus illustrated comprises: upper and lower platens; and a cavity-forming fixture.

The upper movable platen 1 and the lower stationary platen 2, have opposed parallel flat surfaces. The platens 1 and 2 are preferably mounted in a suitable press (not shown) for relative movement between one narrowly spaced "expansion" position, in which passageway panels 3 are expanded, and another more widely spaced "loading" position, in which the passageway panels 3 are inserted into and removed from the space between platens. The lower platen is provided with a conduit 4 for introducing a holding liquid under pressure between the lower platen and a panel placed upon it.

Figure 5:
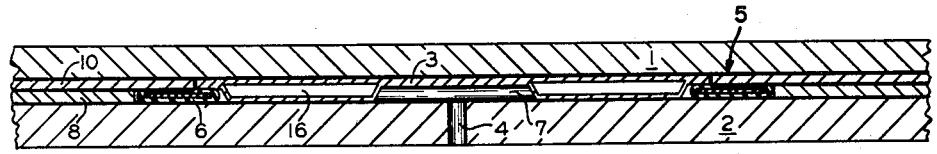
Fig. 5 is a section taken along lines 5—5 of Fig. 4.

The cavity-forming fixture 5, as illustrated in Fig. 5, is mounted on the lower platen. This fixture comprises: a sealing ring; and means anchoring it on one platen.

The sealing ring is in the form of a flat gasket-like sealing ring 6. It is supported on the lower platen 2 and cooperates therewith to form an upwardly open pan-like flat-bottomed cavity 7.

Figure 3:
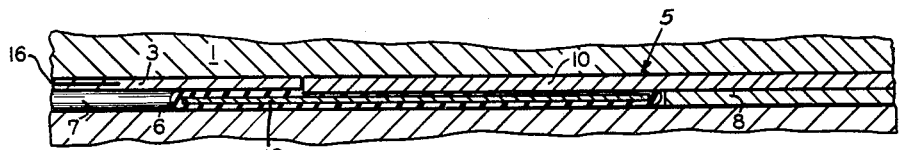
Fig. 3 is an enlarged fragmentary section taken along lines 3—3 of Fig. 2 and showing the apparatus holding an unexpanded panel.

The ring anchoring means includes a pair of shims. The lower sheet or shim 8 surrounds the ring to center it on the lower platen and to support it against radially outward displacement by the holding pressure in the cavity 7 during the expansion of the passageway panel 3. To do this, the shim 8 has an opening 9 which corresponds to the external size and shape of the sealing ring 6 and, thus, snugly receives it. The upper shim 10 is fixed over the lower shim 8 and has an opening 11 outlined by inner edges of the shim 10 which project over the outer portions of the sealing ring 6 and, as seen in Fig. 3, press the sealing ring 6 downwardly against the lower platen 2.

The shims 8 and 10 are provided with projecting tabs 12 at each of their ends which are perforated for receiving mounting bolts. In the operative position of the fixture 5 on the lower platen 2, mounting bolts 13 extend through the aligned tabs 12 and are fixed to bosses 14 attached at the ends of the lower platen 2.

The opening 11 in the top shim 10 is in the form of a slot which opens at the left-hand edge of the shim 10. The upper face of the lower shim 8 adjacent its left-hand edge is grooved at 15 between its outer edge and the opening 9 to accommodate the expansion of the connection conduit in the panel 3 communicating between the passageway area 16 of the panel and a suitable inlet pipe 17 plugged into the connection conduit and connected to a source of fluid pressure. In the assembled position of the fixture 5, the mouth of the slot opening 11 in the top shim 10 overlies the groove 15 in the bottom shim 8.

As seen in Fig. 5, the opening 11 in the top shim 10 corresponds in shape and size to the passageway panel 3 and receives and aligns the panel during its expansion. The opening 11 in the top shim 10 is slightly smaller in width than the opening 9 in the bottom shim 8 so that the lower face of the shim 10, adjacent the inner longitudinal edges of the opening 11, rests upon the outer portions of the upper face of the sealing ring 6 and presses it downwardly against the lower platen 2.

The resilient sealing ring 6 is thicker than the lower shim 8 (Fig. 3) so that it will be compressed to provide a satisfactory seal when the fixture 5 is clamped between the platens 1 and 2 in a panel expansion position. The sealing ring 6 contains a flat central core 18 of metal covered by a resilient outer surface of a material such as "neoprene." The shims 8 and 10 may be of metal such as aluminum, steel, etc. The top shim 10 may be slightly thicker than the passageway panel 3 to insure that the platens 1 and 2 may be tightly clamped on the fixture 5 without interference from the panel 3. This additional thickness of the top shim 10 should not be more than .007 inch.

In an operative example of the apparatus described, the thickness of the passageway panel 3 is .060 inch, the thickness of each of the top and bottom shims 8 and 10 is .064 inch and the thickness of the sealing ring 6 is .080 inch in an uncompressed condition. In this particular sealing ring, the core 18 is .040 inch in thickness and is made of aluminum with the "neoprene" being applied to it by dipping it in a liquid solution of the material.

*Operation*

Figure 2:
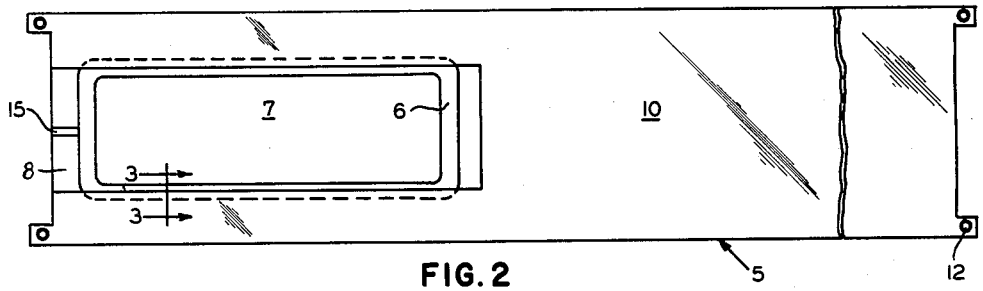
Fig. 2 is a plan view of the assembled apparatus with the panel and the upper platen being omitted.
Figure 4:
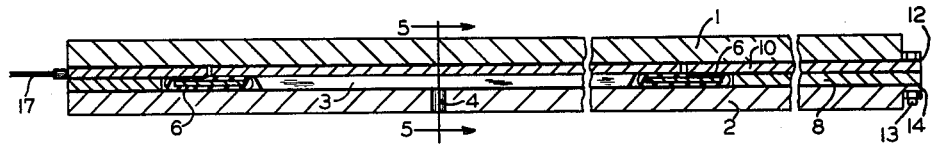
Fig. 4 is an elevational section taken along the longitudinal center of the novel expansion apparatus showing it holding a panel being expanded.

In preparing the apparatus for expanding a pressure welded passageway panel 3 on one-side, the platens 1 and 2 are moved apart to a spacing wide enough to permit the ready insertion of an unexpanded panel 3. Preferably, the fixture 5 is already assembled, as shown in Figs. 2 and 3, between the platens and attached to the lower platen 2 by the bolts 13. The panel 3, which has been previously prepared by inserting the inlet pipe 17 in the mouth of the passageway connection conduit terminating at the edge of the panel, is placed in the slotted opening 11 of the top shim 10 with its margins resting on the sealing ring 6 and with the inlet pipe 17 extending from between the platens at the left-hand side as seen in Fig. 4.

The platens 1 and 2 are then relatively moved toward each other to clamp the shims 8 and 10 together with the unexpanded panel 3 clamped between the sealing ring 6 and the upper platen 1 and the sealing ring 6 being compressed between the lower face of the panel 3 and the lower platen 2. In this clamped position, the cavity 7 provided by the lower platen 2, which forms the bottom of the cavity and the inner edges of the compressed sealing ring 6 which forms the sides of the cavity, is covered by the lower face of the passageway panel 3 while the upper face of the panel 3 is in flush engagement with the upper platen 1. The height of the cavity 7 equals the combined thickness of the shims 8 and 10 minus the thickness of the panel 3.

A holding liquid under a suitable pressure is introduced through the conduit 4 into the cavity 7 to force the panel 3 upward tightly against the upper platen 1. Next, an expending liquid under a suitable higher pressure is admitted through the inlet pipe 17 to the unwelded potential passageway area 16 of the panel 3. This expansion pressure expands or dilates the lower walls of the passageway area 16 downwardly into the cavity 17 and against the lower platen 2 as seen in Fig. 5 while the upper walls of the passageway area 16 are kept from expanding upwardly by the holding liquid pressing the upper face of the panel 3 tightly against the upper platen 1. As a result, the panel 3 is expanded on only one side or face. The difference between expansion and holding pressures may vary widely. Good results can be obtained with differences ranging from 600 to 2600 p.s.i. At the present time, expansion and holding pressures of 3000 and 1000 p.s.i. respectively are often employed.

After the expansion of the panel 3 is completed, the expanding pressure and the holding pressure are relieved simultaneously in a manner which will not produce any further deformation of the panel 3, the platens 1 and 2 are opened and the panel is removed. Another panel can then be inserted and expanded by repeating the same foregoing operations. The sealing ring 6 is kept from being dislodged from its proper position, during the removal of a panel 3, by the inner edges of the top shim 10 extending over the outer portions of the sealing ring 6.

*Embodiments of Figs. 6–9*

This embodiment of the panel expansion apparatus expands a portion of a passageway panel on one face and another portion of the panel on the opposite face. Thus, in looking at the panel after it is expanded, one would see only a part of the panel's passageways on one face and the remaining part of the passageways on the opposite face. Briefly, this embodiment comprises the previously described apparatus plus a second cavity-forming fixture attached to the upper platen and forming with that platen a cavity which is vertically offset from the cavity in the lower fixture.

Specifically, this modified apparatus includes an upper platen 20, a lower platen 21, an upper cavity-forming fixture 22 attached on the upper platen 20 and a lower cavity-forming fixture 23 attached on the lower platen 21.

The upper cavity-forming fixture 22 includes a pair of flat sealing rings or gaskets 24 and 25, both of which are similar to the sealing ring 6 of the first embodiment. The sealing rings 24 and 25, in cooperation with the upper platen 20 form a pair of downwardly open cavities 26 and 27. Although the described fixture contains two sealing rings it is obvious that it could just as easily be made with only one sealing ring.

The pair of sealing rings 24 and 25 are seated in and surrounded by an inner shim 28 having a pair of openings accommodating and snugly enclosing the sealing rings 24 and 25. The sealing rings 24 and 25 are held in position by an outer shim 29 having a slot-shaped opening extending from the left-hand edge of Fig. 6. The width of the slot is somewhat less than the width of the external outlines of the sealing rings 24 and 25 and therefore the longitudinal edges of the opening in the outer shim 29 extend over and engage the outer portions of the sealing rings 24 and 25 and press them upwardly against the upper platen as seen in Figs. 7 and 8.

Both the shims 28 and 29 include tabs 30 which project beyond the edges of the platens and are attached by bolts 31 to aligned bosses 32 fixed on the upper platen 20. The upper platen 20 further includes a holding pressure conduit 33 communicating with the cavities 26 and 27.

The lower cavity-forming fixture 23 is similar to the upper fixture 22 except that it is illustrated as containing only one sealing ring 35 which rests on the lower platen 21 and vertically overlaps and extends between the upper sealing rings 24 and 25. The sealing ring 35, in cooperation with the lower platen 21, forms an upwardly open cavity 36.

The sealing ring 35 is snugly encircled by an inner shim 37 which rests on the lower platen 21. An outer shim 38 rests on the shim 37 and has a slot-shaped opening which is similar to the opening in the upper shim 29. The width of the opening in the shim 38 is slightly less than the width of the external outline of the sealing ring 35. This provides the shim 38 with portions which extend over and press the outer portion of the sealing ring 35 downwardly against the lower platen 21.

The shims 37 and 38 are attached to the lower platen by projecting shim tabs 39, bolts 40 and bosses 41 fixed on the lower platen 21. The lower platen further includes a holding pressure conduit 42 communicating with the cavity 36.

Figure 6:
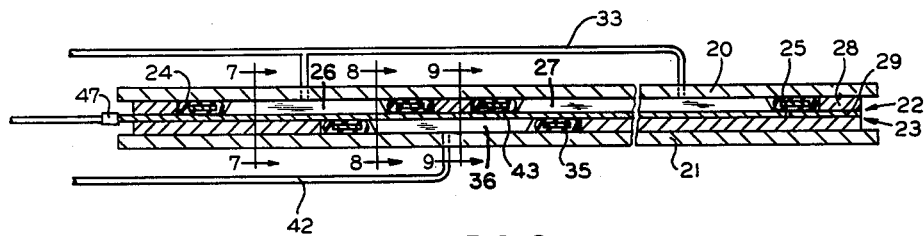
Fig. 6 is an elevational section taken along the longitudinal center of another embodiment of the expansion apparatus.
Figure 7:
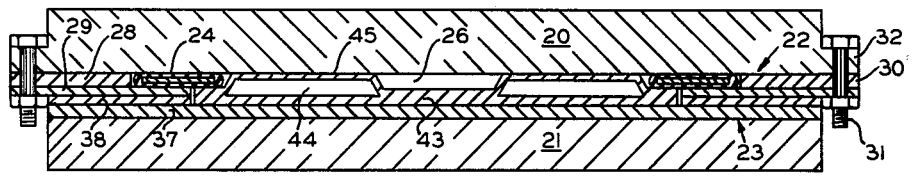
Fig. 7 is a section taken on lines 7—7 of Fig. 6.
Figure 8:
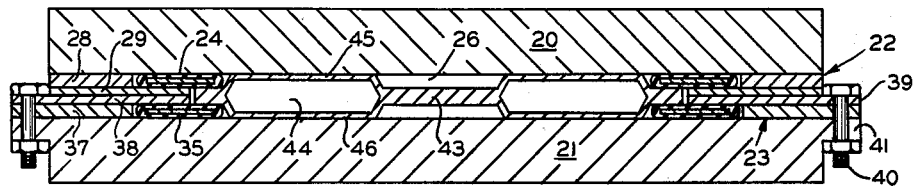
Fig. 8 is a section taken on lines 8—8 of Fig. 6.
Figure 9:
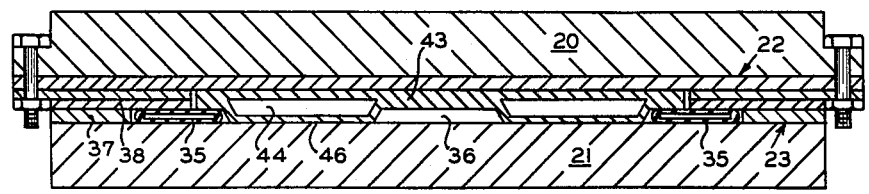
Fig. 9 is a section taken on lines 9—9 of Fig. 6.

Figs. 6 to 9 illustrate a pressure welded passageway panel 43 being expanded between the modified apparatus. The passageways of the panel 43 are designated 44, the upper expanded passageway walls are designated 45 and the lower expanded walls are designated 46. An expansion connection device 47 is shown in Fig. 6 extending into the panel 40 at its left-hand edge.

Each of the sealing rings 24, 25 and 35 are structurally similar to the sealing ring 6 of the first embodiment and include a core covered with elastic material. Each of the outer shims 29 and 38 are about one-half the thickness of the panel 43 prior to being expanded so that both of them will equal the panel thickness when superposed on each other.

Having described my invention, I claim:

1. An apparatus for expanding one side of a pressure welded passageway panel comprising: a pair of relatively movable platens having opposed operative surfaces; a first endless sealing ring supported on one platen and cooperating therewith to form a first holding pressure cavity for a one side expansion operation, said first sealing ring being dimensioned so that each panel operatively placed over it will completely cover said first cavity and overlap the adjacent inner portion of the margin of said first sealing ring; and means for anchoring said first sealing ring removably in its operative position on said one platen, said means including a first gasket-like shim closely surrounding said first sealing ring to support it against radial displacement, said surrounding shim being thinner than said first sealing ring.

2. The apparatus of claim 1 wherein: said first sealing ring has a flat metal core.

3. The apparatus of claim 1 wherein: said first sealing ring has an average width substantially greater than its thickness.

4. The apparatus of claim 1 wherein: said first seal surrounding shim extends lengthwise continuously along the outermost peripheral surface of said first sealing ring.

5. The apparatus of claim 1 wherein: said first seal surrounding shim is transversely indented at a desired point along its margin to accommodate an expansion fluid pressure connection in the margin of the panel.

6. The apparatus of claim 1 wherein: said first sealing ring has a flat metal core and an average width greater than its thickness.

7. The apparatus of claim 6 wherein: said first seal surrounding shim extends lengthwise continuously along the outermost peripheral surface of said first sealing ring and is transversely indented at a desired point along its margin to accommodate an expansion fluid pressure connection in the margin of the panel.

8. The apparatus of claim 1 wherein: said first sealing ring is dimensioned so that each panel placed over it will leave the outer portion of its margin uncovered; and said anchoring means include another gasket-like shim overlapping the outer uncovered portion of said first sealing ring and the adjacent portion of said first seal surrounding shim, said overlapping shim having an opening dimensioned to accommodate a panel to be expanded.

9. The apparatus of claim 8 wherein: said seal overlapping shim, through overlapping engagement with said first sealing ring, holds it against said one platen.

10. The apparatus of claim 8 wherein: said seal overlapping shim has a thickness slightly greater than that of the unexpanded panels the apparatus is designed to receive.

11. The apparatus of claim 1 wherein: a second endless sealing ring is supported on said other platen and cooperates therewith to form a second holding pressure cavity for another one side expansion operation, said cavities being relatively offset from each other with one end of the second cavity overlapping the opposite end of said first cavity, said second sealing ring being dimensioned so that each panel operatively placed between cavities will completely cover said second cavity and overlap the margin of said second sealing ring; and means for anchoring said second sealing ring removably in its operative position on said other platen, said means including a second gasket-like shim closely surrounding said second sealing ring to support it against radial displacement, said second surrounding shim being thinner than said second sealing ring.

12. The apparatus of claim 11 wherein: each sealing ring has a flat metal core, a thickness greater than that of said first seal surrounding shim and an average width greater than its thickness.

13. The apparatus of claim 12 wherein: each seal surrounding shim extends lengthwise continuously along the outermost peripheral surface of said sealing ring surrounded by it.

References Cited in the file of this patent

UNITED STATES PATENTS

| | | |
|---|---|---|
| 1,978,019 | Haushalter | Oct. 23, 1934 |
| 2,284,773 | Sivian et al. | June 2, 1942 |
| 2,679,172 | Clevengen et al. | May 25, 1954 |
| 2,702,411 | Winstead | Feb. 22, 1955 |
| 2,835,961 | Neel et al. | May 27, 1958 |
| 2,857,658 | Luther | Oct. 28, 1958 |
| 2,866,429 | Staples | Dec. 30, 1958 |